United States Patent Office 3,473,083
Patented Oct. 14, 1969

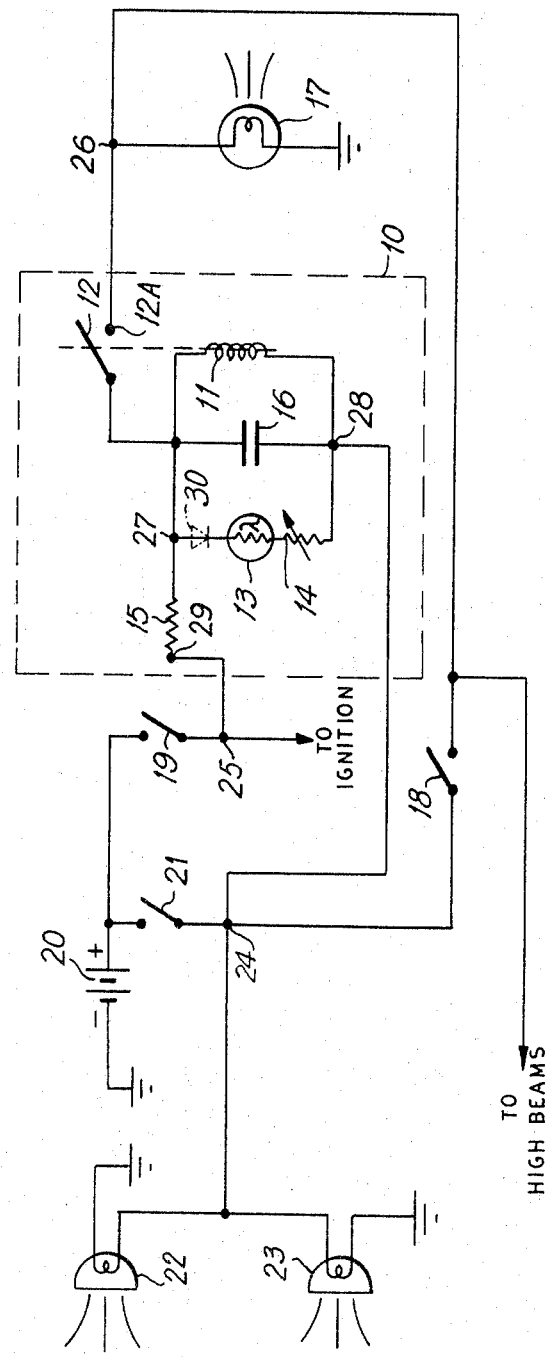

3,473,083
AUTOMATIC VEHICLE LAMP INDICATING SYSTEM
Thomas J. Guida, Rockville Centre, N.Y., assignor of twenty-five percent each to James W. Dowling, Mineola, N.Y., and to Donald E. Belfi, Rockville Centre, N.Y.
Filed Mar. 30, 1967, Ser. No. 627,220
Int. Cl. B60q 1/02
U.S. Cl. 315—82
9 Claims

ABSTRACT OF THE DISCLOSURE

A photosensitive headlight indicating system for use in a vehicle wherein a time-delay relay responsive to a photocell is connected to both the ignition switch and the light switch of the vehicle. The output of the relay is connected to an indicating device, such as a dashboard lamp, so that when the vehicle is in motion under darkness and the headlights have not been turned on, a flashing indication will be produced to alert the driver of his situation. The invention also provides an indication when the headlights fail or are left turned on after the vehicle is not in use.

---

This invention relates to a headlight warning system for use in moving vehicles.

More specifically this invention relates to a photosensitive headlight warning system to alert drivers operating motor vehicles to turn on their headlights during conditions of limited light and visibility.

In the operation of a motor vehicle from daylight to darkness, a driver often neglects to turn on his headlights particularly when driving in well lighted surburban and city streets. Moreover, drivers who start their cars at night and enter brightly lighted intersections and roadways will often drive many miles before discovering that they have not turned on their headlights. Drivers who operate their vehicles without lights endanger other motorists as well as themselves, and often become subject to arrest for violation of local traffic ordinances.

There are presently known many conventional devices available which utilize photosensitive devices to operate the headlights and highbeams in response to various lighting conditions. Many of these devices employ complex electronic circuitry coupled to the light switch of the car to operate the headlamps automatically when the driver is moving under conditions of darkness. Because of their complex circuitry, these known devices suffer from the disadvantage of being unreliable in operation and costly to purchase, operate and maintain.

Accordingly, the present invention provides a compact photosensitive electronic circuit, utilizing a minimum number of components, to alert the driver of a moving vehicle under conditions of darkness that his headlights have not been turned on. The circuit employs a photosensitive device, in combination with a relay, that senses the amount of light surrounding a vehicle and, under conditions of limited visibility and brightness, operates a flashing signal or light on the dashboard of the vehicle to alert the motorist of his failure to turn the headlights on.

The circuit according to the invention also provides a fail-safe indication to the driver if both of his headlights are defective. The circuit further provides a warning indication to the motorist upon his failure to turn the headlights off after he leaves the vehicle.

The circuit according to the invention employs a photoelectric cell in shunt combination with a time-delay relay and has its power inputs coupled to the ignition switch and the headlamp switch of the vehicle. The output of the circuit is coupled to a lamp or other warning indication device. The lamp or indicating device may be an independent component or may include one of the lamps or indicating devices presently provided in the instrument panel of the vehicle. When the indicating lamp begins to flash, the driver is alerted, and upon turning on his headlamps, the flashing discontinues.

It is therefore an object according to the present invention to provide a photosensitive headlamp warning system to indicate to motorists the failure of turning on their headlights under conditions of limited visibility and brightness.

It is another object according to the present invention to provide an indication system which detects the failure of operation of the headlamps of a vehicle.

It is another object according to the present invention to provide a warning indication system which alerts the motorist after using the vehicle that the headlamps have inadvertently been left on.

It is a further object according to the present invention to provide a photosensitive headlamp indication system which is simple in design, easy to manufacture, and reliable in operation.

It is a further object according to the present invention top rovide a headlamp indication system which may be readily adapted to both new and existing vehicles.

Other objects and features of the present invention will become apparent from the following detailed description considered in connection with the accompanying drawing which discloses an embodiment of the present invention. It should be understood, however, that the drawing is designed for the purpose of illustration only and not as a definition of the limits of the invention, as to which reference should be made to the appended claims.

In the drawing, the figures shows a schematic circuit diagram of one embodiment of the present invention.

Referring to the drawing there is shown in part the electrical wiring of a vehicle having headlamps 22 and 23 electrically connected to a headlamp switch 21 for connecting and disconnecting the headlamps to battery 20. Another connection to battery 20 includes ignition switch 19 which, upon actuation, energizes the ignition system of the vehicle. Connected to junction 24 of light switch 21 is a high-beam switch 18, commonly found on the floor of the vehicle in close proximity to the left foot of the driver.

The circuit 10 according to the invention includes a relay having a coil 11 and a normally-opened contact 12. Connected across relay coil 11 is a capacitor 16 and the series combination of photoelectric device 13 and potentiometer 14. Junction 27 of the parallel circuit combination is connected to contact arm 12 of the relay and to load resistor 15. The opposite end of load resistor 15 is coupled to junction 25 at the base of the ignition switch 19. Junction 28 of the parallel combination is connected to junction 24 at the base of light switch 21. Junction 24 may also be connected to the voltage regulator relay of the vehicle to sense the operation of the engine. Contact 12A is connected to junction 26 of indicator light 17. Light 17 may consist of an independent lamp mounted within the view of the driver, or one of the existing lamps found in the instrument panel. Most vehicle instrument panels include a high-beam indication lamp within the panel connected to the high-beam switch 18, as illustrated in the drawing.

The operation of the circuit according to the invention is as follows:

When the driver start the engine of his vehicle he closes ignition switch 19 which in a well-known manner provides power to the ignition system of the vehicle. The closing of switch 19 also energizes junction 25 to provide electrical power through load resistor 15 to junction 27. Under conditions of daylight when light switch 21 is normally open, junction 24 is connected to the chassis ground through the low resistance of the filaments of headlights 22 and 23. The filaments of headlights 22 and 23 have a parallel filament resistance normally less than 3 ohms, and when connected to junction 28 of circuit 10, serve as a ground potential with respect to the high impedance of components 11, 13, and 16.

Photoelectric device 13 may consist of a cadmium sulfide or cadmium selenide cell which under light conditions of 2 foot candles or greater exhibits a low resistance of a few hundred ohms to the parallel circuit. By selecting the resistance of relay coil 11 with the same order of magnitude as cell 13, it is possible to utilize the cell as a current shunt so that a sufficient amount of the total current flowing through resistor 15 will by-pass relay coil 11 through cell 13 and maintain the relay in an unenergized state as shown in the figure. Under conditions of darkness the resistance of cell 13 increases substantially to release a greater amount of current to pass through relay coil 11. Coil 11 will actuate contact arm 12 upon contact 12A to connect lamp 17 to junction 27. Because of its low impedance, lamp 17 will draw a major portion of the current previously required to maintain the relay energized. Capacitor 16, on the other hand, will discharge thru coil 11 and maintain the relay energized for a short duration after lamp 17 becomes lighted. Coil 11 will then release contact arm 12 and extinguish the light to permit the current through load resistor 15 to increase sufficiently to reclose relay 11. The relay thus serves as a flasher circuit for lamp 17 during its cycling between closed and opened positions.

The sensitivity of photocell 13 may be adjusted by variable resistor 14 to compensate for variations in lighting conditions and placement of the cell within the vehicle. When the motorist closes light switch 21 after lamp 17 has been flashing, battery power will be applied to junction 24 to turn the headlights on. Power is also supplied to circuit junction 28 to reduce the potential drop across circuit 10 and thus terminate its operation.

If the driver turns off the ignition by opening switch 19 and fails to open light switch 21, the battery potential will appear across terminals 24 and 25 in opposite polarity due to the low impedance of the accessories connected to the ignition circuit. The electrical potential which is now applied across circuit 10 will cause, under darkness, relay coil 11 to actuate contact arm 12 so as to flash lamp 17. Lamp 17 will not flash under daylight conditions due to the influence of cell 13 unless a diode 30, shown in dotted lines, is connected in series with cell 13 to back-bias and block the current that would normally pass through cell 13 under the aforementioned condition of reverse polarity. The insertion of diode 30 thus enables circuit 10 to warn the driver during the daytime that his headlights have been left inadvertently turned on after his ignition has been shut off.

If both of the filaments of headlamps 22 and 23 are broken, no low impedance ground potential will be applied to terminal 28 or circuit 10. Thus if the driver places his hand over cell 13 to simulate darkness, lamp 17 will fail to flash and will indicate to the driver that there is a failure in his headlight system. In a similar manner, the driver may also check for a failure in his high-beam lights by depressing switch 18.

From the above description of the circuit according to the invention it is apparent that the driver of a vehicle is alerted upon the failure to turn his headlights on when in motion, the failure to turn them off when not in motion, and upon the complete failure of both his headlights and high-beams.

The circuit utilizes a minimum of components to accomplish the above-described features and may be packaged in a compact module for easy installation in new and existing vehicles.

While only a single embodiment of the present invention has been shown and described, it will be understood that many other changes and modifications may be made therein without departing from the spirit and scope of the invention as defined by the appended claims.

What is claimed is:

1. A photosensitive vehicle lamp indication system for connection to a vehicle having an ignition and lamps comprising;
   a time delay power control circuit having its input terminals connected to the ignition and the lamps,
   a photoelectric device coupled to said power control circuit,
   indicating means coupled to the output of said power control circuit, so that under conditions of low illumination said photoelectric device will actuate said power control circuit to operate said indicating means when said vehicle lamps are unlighted and the ignition is energized.

2. The system as recited in claim 1 wherein said power control circuit comprises a relay having a relay coil and a capacitor connected across said relay coil.

3. The system as recited in claim 2 wherein said photoelectric device is a photocell having a low impedance with respect to said relay coil when illuminated so as to inhibit the operation of said relay under conditions of high illumination.

4. The system as recited in claim 3 wherein said indicating means is a lamp, said lamp being momentarily shunted across said relay coil when said relay coil is energized so as to de-energize said relay and cause said lamp to flash.

5. The system as recited in claim 1 additionally comprising adjusting means coupled to said photoelectric device for adjusting the sensitivity of operation of said indicating lamp.

6. The system as recited in claim 5 wherein said adjusting means comprises a variable resistor.

7. The system as recited in claim 6 additionally comprising a diode in series connection with said photocell to back bias said cell when said ignition is de-energized and said vehicle headlights are on.

8. The system as recited in claim 1 wherein said photoelectric device comprises a cadmium sulfide cell.

9. The system as recited in claim 1 wherein said photoelectric device comprises a cadmium selenide cell.

References Cited

UNITED STATES PATENTS 2,820,215   1/1968   Hughes _____ 340—252 X

JAMES W. LAWRENCE, Primary Examiner

PALMER C. DEMEO, Assistant Examiner

U.S. Cl. X.R.

315—130